M. C. DEARING.
JAR OPENER.
APPLICATION FILED NOV. 6, 1908.
914,119.
Patented Mar. 2, 1909.
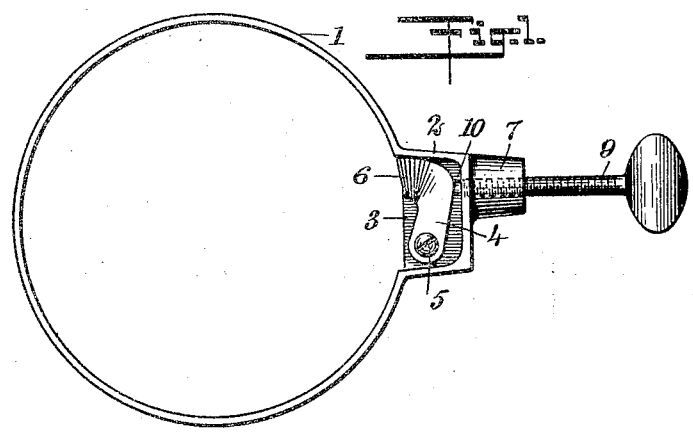
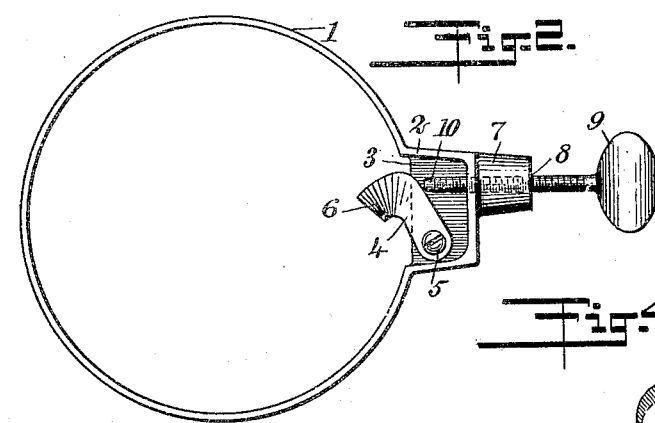
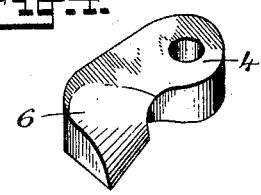
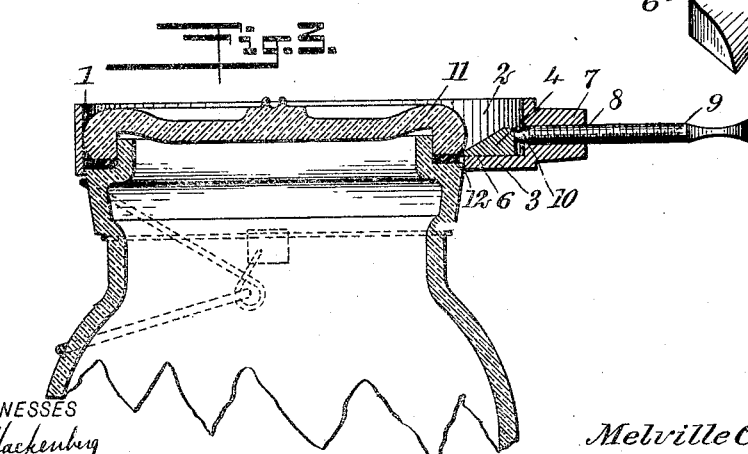
WITNESSES
F. G. Hackenburg
INVENTOR
Melville C. Dearing
BY Munn & Co.
ATTORNEYS

UNITED STATES PATENT OFFICE.

MELVILLE C. DEARING, OF HAVERHILL, MASSACHUSETTS.

JAR-OPENER.

No. 914,119. Specification of Letters Patent. Patented March 2, 1909.

Application filed November 6, 1908. Serial No. 461,329.

*To all whom it may concern:*

Be it known that I, MELVILLE C. DEARING, a citizen of the United States, and a resident of Haverhill, in the county of Essex and State of Massachusetts, have invented a new and Improved Jar-Opener, of which the following is a full, clear, and exact description.

This invention relates to jar openers, and more particularly such as are adapted to be arranged about the tops of jars or other receptacles, and each of which in general includes a collar, a spreader pivotally secured at the inside of the collar, and means for forcing the spreader between the jar and its cover so that the latter can be easily removed.

The object of the invention is to provide a device of the class described, simple and serviceable in construction and inexpensive to manufacture, which can be arranged about the top of a fruit jar or other receptacle, and which has means whereby the cover of the jar may be readily removed, without danger of injury to the same or to the rubber washer on which it rests.

Reference is to be had to the accompanying drawings forming a part of this specification, in which similar characters of reference indicate corresponding parts in all the views.

Figure 1 is a plan view showing the spreader in an inoperative position; Fig. 2 is a similar view, showing the spreader being moved into an operative position; Fig. 3 is a sectional view showing an embodiment of my invention arranged about the top of a jar; and Fig. 4 is an enlarged perspective view of the spreader.

Before proceeding to a more detailed description of my invention, it should be understood that I provide a jar opener, which is especially adapted for removing covers from glass fruit jars or like receptacles. However, it should be understood that I do not limit myself to the specific form shown in the drawings, as others equally advantageous may be used without departing from the spirit or the scope of the invention. For instance, my device may be used for removing the tops from tin cans or the like, where it is necessary to provide means which will cut through the side so that the top can be removed to allow access to the contents.

In the specific form shown in the drawings, I provide a collar 1 formed of any suitable metal, and which is adapted to be arranged about the top of a jar or other receptacle. The collar has an extension 2 on one side thereof which is substantially rectangular in form. The extension has a web or base 3 on which a spreader 4 is pivotally arranged, being held in place by means of a screw or rivet 5. As shown most clearly in Fig. 1 of the drawings, the extension in combination with its base, forms a recess to receive the spreader when the latter is in the inoperative position. The spreader has a portion 6 laterally disposed and beveled, for a purpose to be hereinafter described. Integral with the extension and located on the outside thereof is a boss 7, the latter having a threaded opening 8 which extends through the extension 2. Adapted to be arranged in this opening 8 is a correspondingly threaded operating member 9, the end 10 thereof serving to engage the back of the spreader so that, as it is advanced, it will force the spreader into an operative position out of the recess in which it normally lies.

In the operation of my device, when employed with fruit jars or other similar receptacles, the collar 1 is arranged about the top thereof, the spreader being in the inoperative position within the recess formed by the extension 2. When the collar is in position the operating member is advanced in the opening 8 and moves the spreader in a plane parallel to that of the base 3. The beveled edge 6 of the spreader then engages the top 11 of the receptacle at the point where it seats on its washer 12. As the spreader is still further advanced, it acts as a wedge to loosen the cover so that it can be easily removed from the top of the jar. By rotating the collar 1 when the spreader 4 is projected, the cover can be raised from the jar at all points of its periphery.

Having thus described my invention, I claim as new and desire to secure by Letters Patent:—

1. In a device of the class described, a collar adapted to encircle the top of a covered receptacle, said collar having an extension, a spreader pivoted within the extension and movable toward and from the center of the collar, said extension being provided with a boss having a threaded opening, and an operating member threaded through the boss and engaging the spreader for the purpose set forth.

2. In a device of the class described, a collar having an extension provided with a base, a spreader having one end pivotally secured to the base and having its other end laterally disposed and beveled, and an operating member threaded through the extension and engaging the spreader for the purpose set forth.

In testimony whereof I have signed my name to this specification in the presence of two subscribing witnesses.

MELVILLE C. DEARING.

Witnesses:
MARY J. FLANAGAN,
GEORGE A. MARTIN.